United States Patent [19]
Taylor

[11] 3,905,695
[45] Sept. 16, 1975

[54] CONTROLLED READING DEVICE

[76] Inventor: Stanford E. Taylor, Hawk Dr., Lloyd Harbor, N.Y. 11743

[22] Filed: Mar. 1, 1973

[21] Appl. No.: 337,151

Related U.S. Application Data

[62] Division of Ser. No. 258,162, June 1, 1972, Pat. No. 3,757,432.

[52] U.S. Cl. ............................... 353/111; 353/120
[51] Int. Cl.² .................. G03B 23/00; G03B 23/08
[58] Field of Search ................ 353/111, 108, 25–27, 353/15–19, 120, 122, 43, 95; 35/35 B; 40/106.1

[56] References Cited
UNITED STATES PATENTS

| | | | |
|---|---|---|---|
| 1,402,791 | 1/1922 | Petherick | 353/111 |
| 1,482,387 | 2/1924 | Donaldson | 353/111 |
| 2,583,510 | 1/1952 | Ingram | 353/108 |
| 3,138,061 | 6/1964 | Greenaway | 353/17 |
| 3,179,004 | 4/1965 | Stoyanoff et al. | 35/35 B |
| 3,297,398 | 1/1967 | Donofrio | 353/120 |
| 3,716,293 | 2/1973 | Kitano et al. | 353/27 |

FOREIGN PATENTS OR APPLICATIONS

| | | | |
|---|---|---|---|
| 564,122 | 6/1957 | Italy | 353/43 |

*Primary Examiner*—Harry N. Haroian
*Attorney, Agent, or Firm*—Kane, Dalsimer, Kane, Sullivan and Kurucz

[57] ABSTRACT

A controlled reading method and apparatus useful in improving a person's ability to view and to comprehend reading material in line by line sequence wherein each line is unveiled and occluded to view in segments in the direction of reading from the beginning of the line to the end of the line with the beginning and central segments being scanned and occluded at controlled rates of speed which may be related to the person's reading ability and with the beginning segment being unveiled at a relatively more rapid rate and the terminal segment being occluded at a relatively more rapid rate whereby the transition from the end of each line to the beginning of the succeeding line is more rapid and a relatively greater length of reading material is more rapidly exposed at the beginning of the next line to facilitate recognition. The unveiling scanning and occluding of the segments of the line may be accomplished by means of a movable mask or shutter with an aperture shiftable with respect to each line so as to scan the line from beginning to end with the said aperture being in the form of an elongated or helical slot arranged at an angle with respect to the length axis of the line to be scanned with the initial portion of the slot being disposed in a downward direction and the terminal portion in an upward direction with respect to the axis of the line and with the leading and trailing edges of the central segment of the slot and the trailing edge of the initial segment of the slot being disposed at relatively greater angles to said length axis of the line than the remaining edges of the slot and with the trailing edge of the terminal segment and the leading edge of the initial segment of the slot being disposed at a relatively lesser angle to the length axis of the line. The lines of reading material may be formed on a film strip mounted on a stick slide having ratchet-like notches formed along the sides of the slide and advanced line by line by means of mechanism actuated by operation of the shutter. Various controls are provided whereby the reading range can be varied, the film stopped at any line, moved backwards to repeat a line, or advanced manually, or lines of material can be projected tachistoscopically.

4 Claims, 9 Drawing Figures

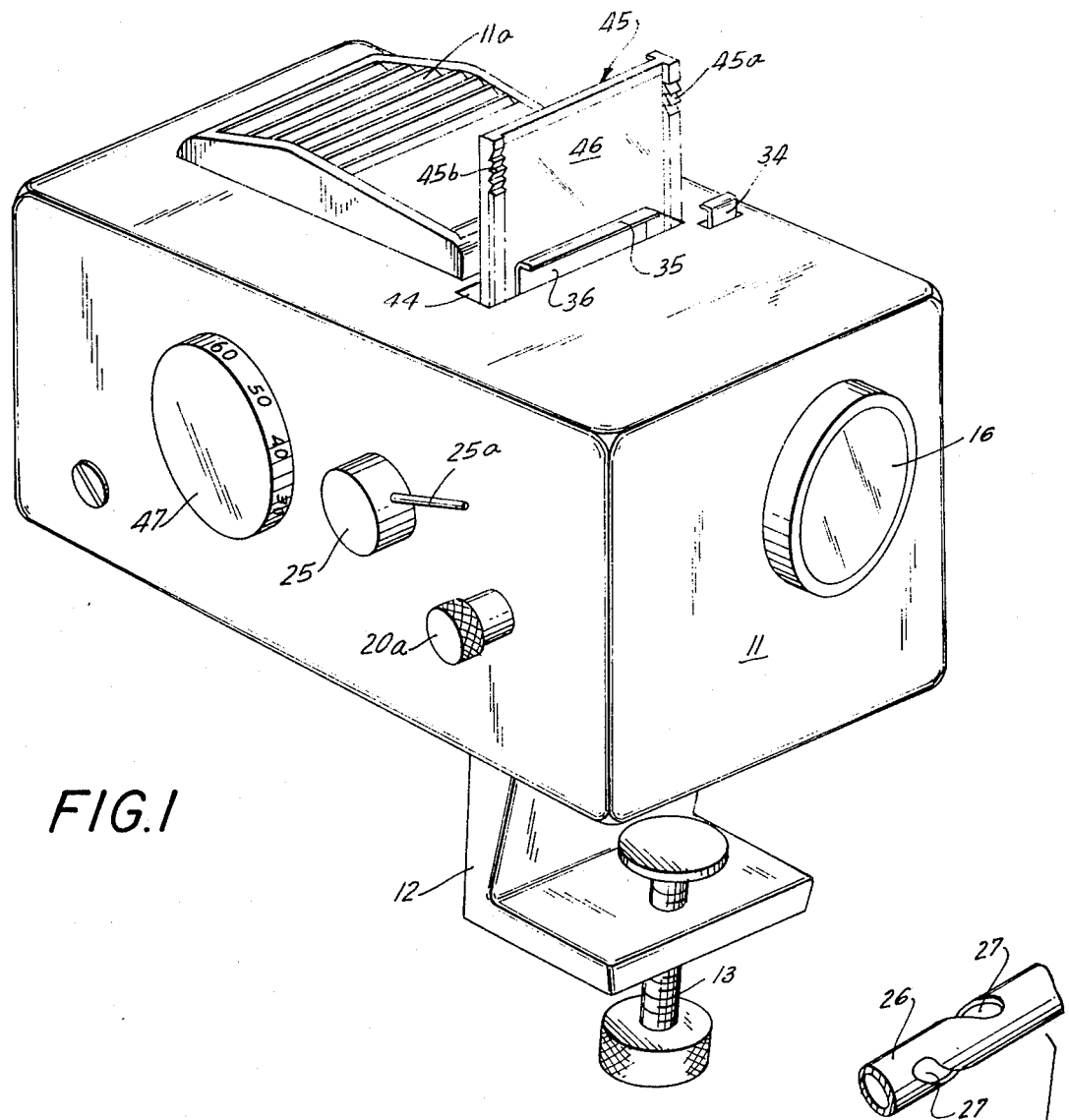
FIG. 1
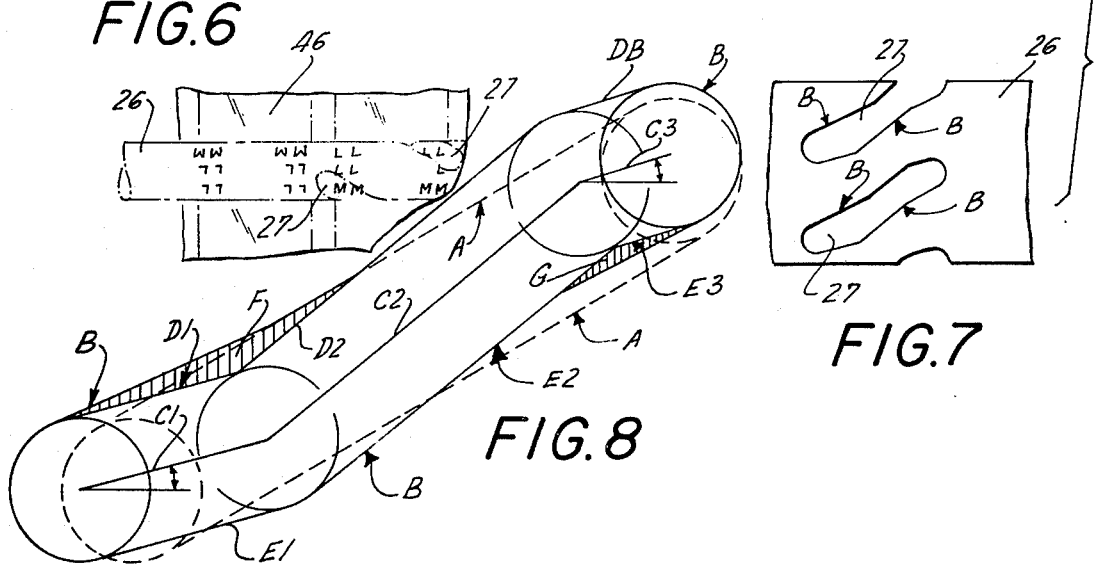
FIG. 6
FIG. 8
FIG. 7

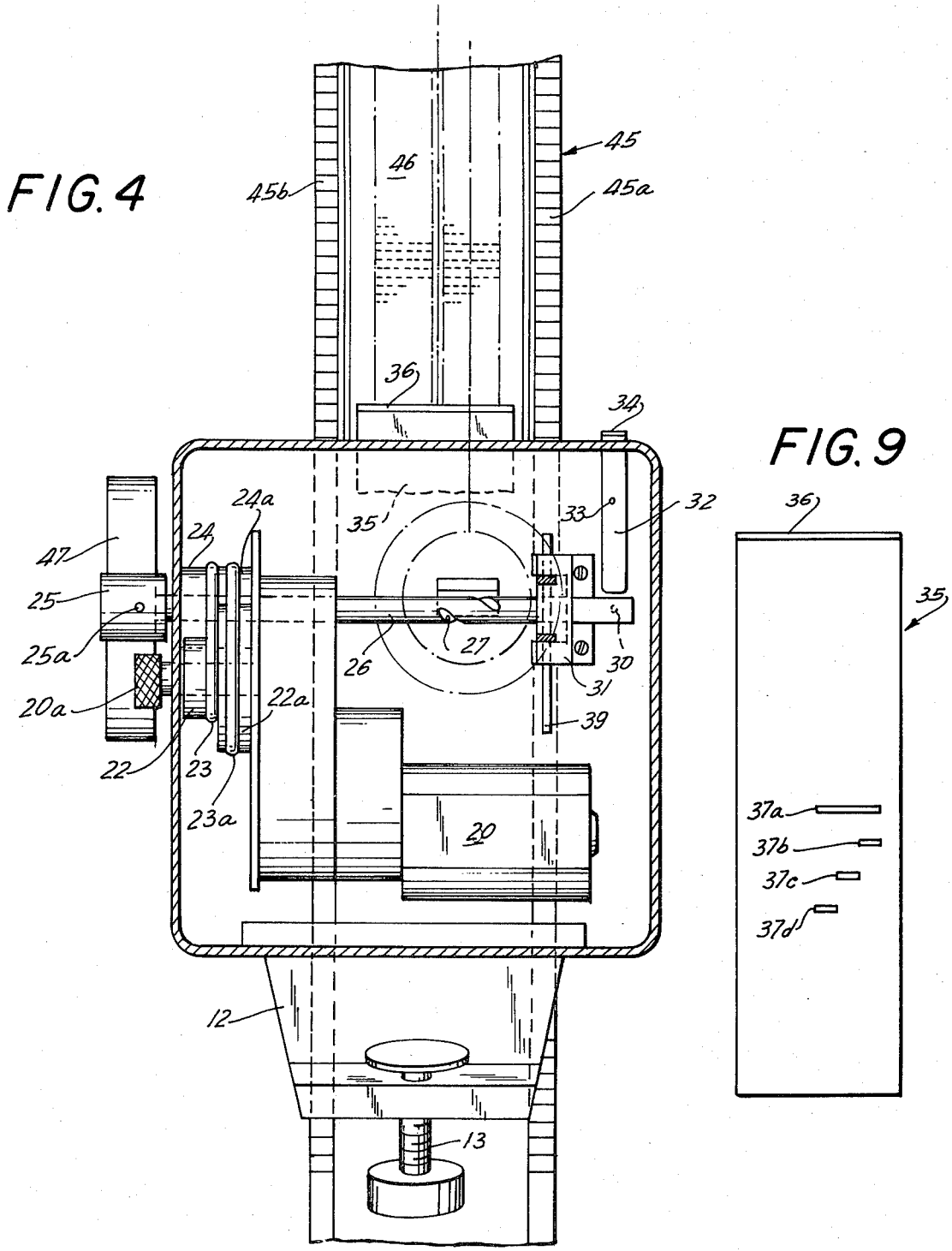

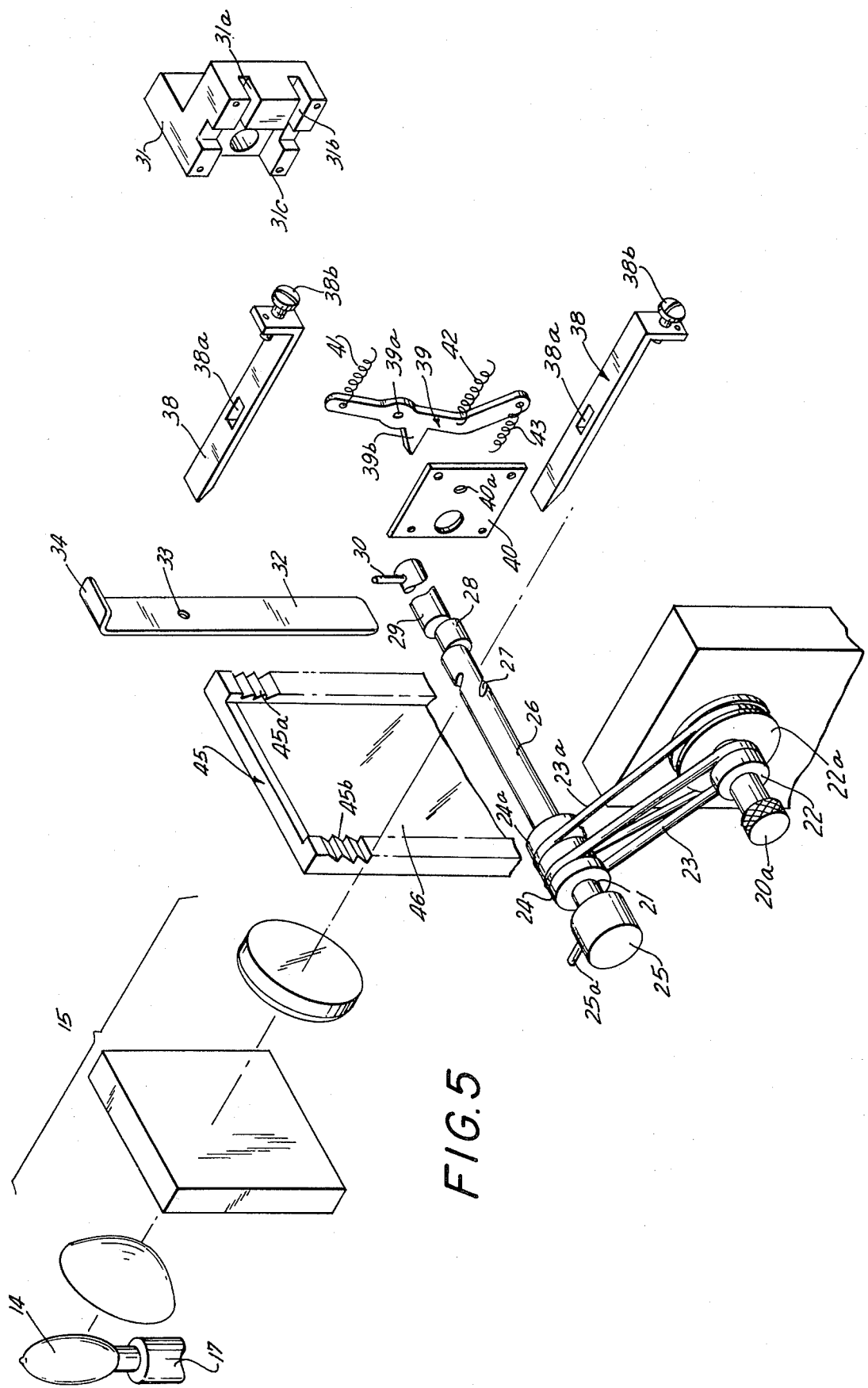

CONTROLLED READING DEVICE

This is a division of application Ser. No. 258,612, filed June 1, 1972, now U.S. Pat. No. 3,757,432.

BACKGROUND OF THE INVENTION

My U.S. Pat. No. 2,745,313 covers a "Controlled Reading Projector" for exhibiting reading material in progressive sequence in the direction of reading for increasing the ability of a person to read with greater speed and accuracy. The present invention embodies various improvements over the projector of that patent and the devices disclosed in other pertinent patents in this field. Such improvements are specified in more detail hereinafter.

SUMMARY OF THE INVENTION

It is an object of this invention to provide an improved controlled reading device and method wherein the terminal portion of a line being unveiled and occluded in segments in the direction of reading is occluded at a relatively more rapid rate and the initial portion of the succeeding line is unveiled at a relatively more rapid rate whereby transition from the end of one line to the beginning of the next line is more rapid and recognition of the beginning of the next line is facilitated.

It is a further object to provide a device in which the film strip is mounted on a semi-rigid stick slide which is fed through the projector by gravity to give a more rapid line to line indexing, a means by which this reading material can be pulled up manually in order to repeat segments of material, and a means whereby film material can be more easily handled and engaged with less film damage and wear.

It is a further object to provide a tachistoscopic feature which presents high speed exposures of words, symbols, pictures or other like material.

It is a further object to provide for processing training otherwise known as continuous tachistoscopic projection in which words of a story are projected, one word per line, at rates much higher than those usual for left to right reading.

It is a further object to provide a momentary control mechanism for the device to permit stopping the film at any line should a teacher wish to discuss the content.

It is a further object to provide a filmstrip stick slide for the device which permits two rows of lines of information to be positioned side-by-side with one row right side up and the other row upside down whereby reversal of the slide allows showing the second row of lines, thus providing a more condensed and compact film form.

BRIEF DESCRIPTION OF THE DRAWING

Other objects and advantages will become apparent from the following description which is to be taken in conjunction with the accompanying drawings, in which:

FIG. 1 is a perspective view of the device of the present invention;

FIG. 4 is a front view partially in section;

FIG. 5 is an exploded perspective view of some of the main elements of the device;

FIG. 6 is a fragmentary view of the film strip and helix;

FIG. 7 is a view of the form of slot for the helix;

FIG. 8 is an enlarged view showing how the slot for the helix is cut in the helix tube; and FIG. 9 is a front view of the plate sliding mask of the device.

DESCRIPTION OF THE PREFERRED EMBODIMENTS

Referring more particularly to the drawings, there is shown in FIG. 1 the device embodying the present invention. The projection system and all other elements of the device are mounted above base plate 10 and enclosed within a cover or casing 11 secured to the base. However, if a projection lamp of 12 volts is used, a transformer will be necessary, which transformer can be mounted underneath the base plate 10. If a 110 volt lamp is used no transformer will be required. For convenience and ease of removal of such cover to get at the various parts, it has been found advantageous to form the cover of at least two parts, but this can be varied as preferred.

Forming a part of the base plate 10 is an integral mounting bracket 12 into which is threaded a hand screw member 13. If a transformer is mounted under the base plate 10, the length of the bracket 12 can be extended to provide room above the screw member 13. Such bracket and screw member permit the device to be easily clamped onto all of the learning stations being provided today for learning laboratories, learning resource centers, communication laboratories, etc. This avoids the necessity of providing a special tablet or extension to accommodate the reader. A bolt can be substituted for the screw member so that the reader can be bolted to a booth to prevent easy removal. If free standing use is desired, this device can likewise be bolted to a tripod, metal plate or similar stand.

Figure 2:
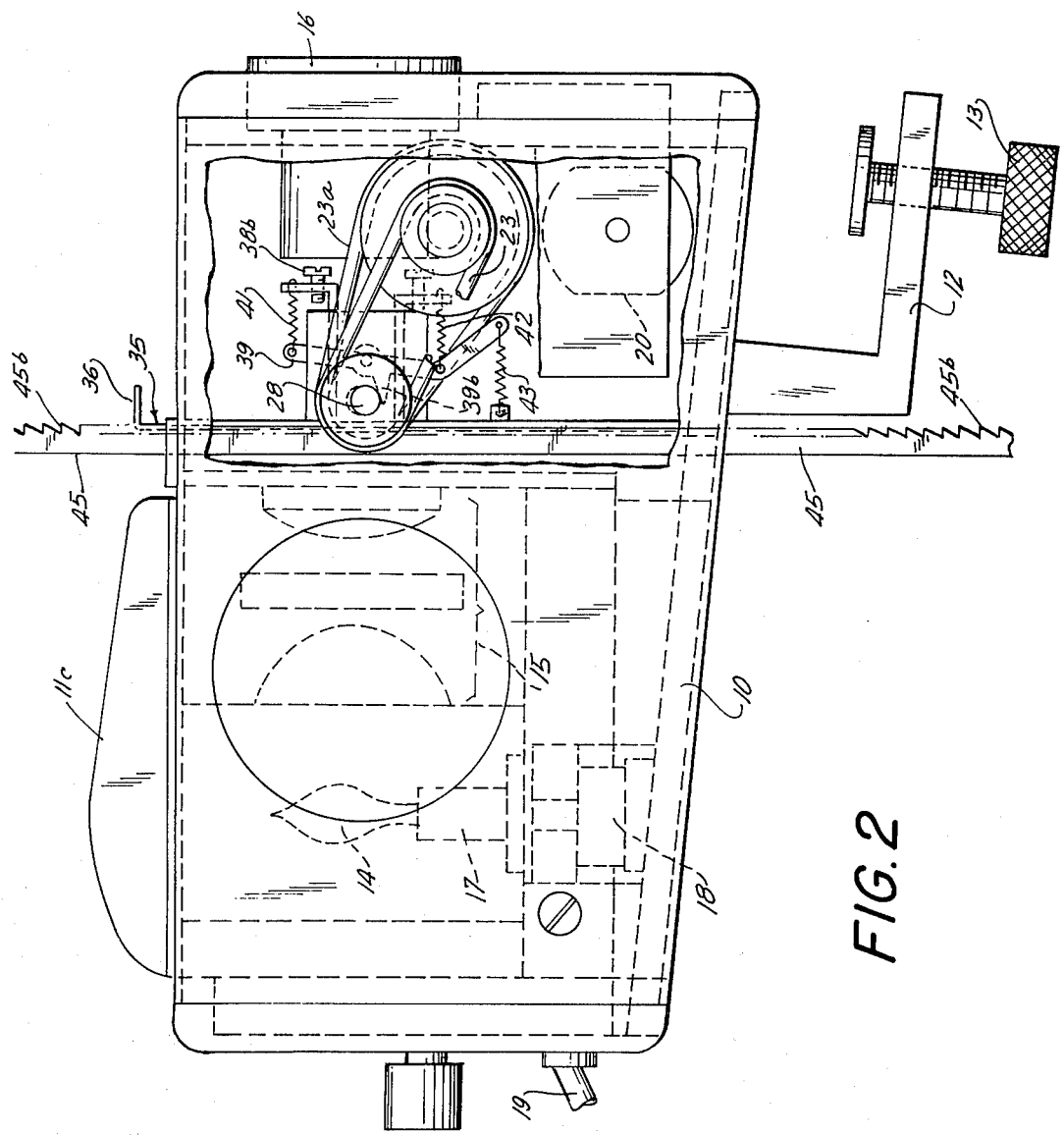
FIG. 2 is a side view partially in section.
Figure 3:
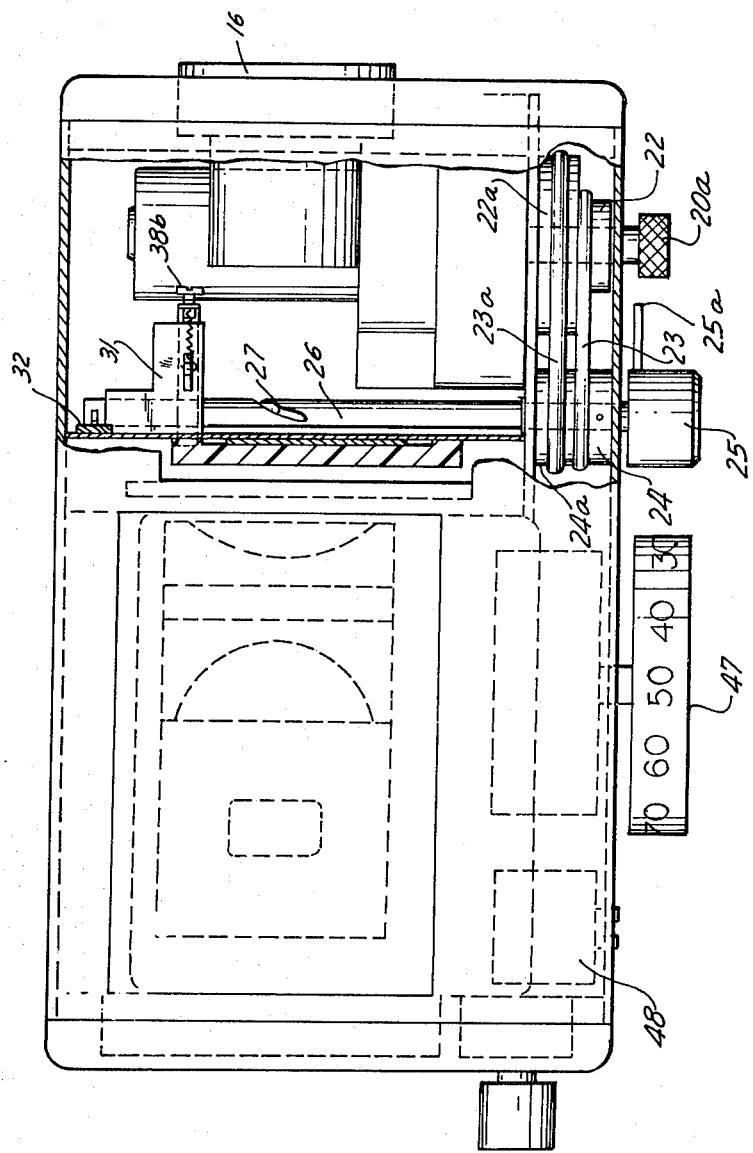
FIG. 3 is a top view partially in section.

The projection system, shown in FIG. 2, includes a projection lamp 14, a condensing lens system 15, and a lens and tube 16 passing through the cover 11, all of which are in aligned relationship. The lamp 14, mounted in a socket 17 secured to a fixture 18, is connected to wires 19 whereby electric current can be supplied to the lamp. Above the lamp the casing 11 is provided with a ventilator 11a to permit the release of the heat which will be generated by the lamp.

Also mounted on the base plate 10 is an electric gear motor 20 which drives the helix shaft 21 through motor pulleys 22 and 22a, belts 23 and 23a and helix pulleys 24 and 24a (FIG. 5). The shaft of the motor has a slidable sleeve over it so that a key can be moved by means of knob 20a to engage a slot in either pulley 22 or 22a. In this manner the helix shaft can be driven at a 1:1 or 1:4 ratio. Such speed shifter is conventional and is not shown in detail. Secured to the shaft 21 are knob 25 with pin 25a for manual rotation of the shaft, cylindrical helix member 26 provided with a helical slot 27 extending diametrically across the cylindrical member, cam 28, and brake member 29 provided with a pin 30 which serves as a brake as hereinafter described. One end of the shaft 21 is mounted on a side of the device above the base plate with the shaft passing through the casing and the knob 25 accessible from the outside of the device. The brake member 29 at the other end of the shaft 21 passes through an L-shaped mounting block 31 secured to the internal cross-frame of the device with the pin 30 extending beyond the block so that it can rotate freely. A pivoted spring plate 32 is secured to the internal cross-frame by pivot 33. The plate 32 projects through the top of the casing and is provided with a handle portion 34 which permits the plate to be moved into the path of the pin 30 thereby braking the shaft 21 and preventing it from rotating. When the plate 32 is pivoted so that it is out of the path of the pin 30, the shaft 21 is free to rotate.

In addition, pressing on pin 25a will cause pin 30 to override spring 32 and the shaft will move through one complete revolution, providing rapid line changes which can be used to provide tachistoscopic exposures.

The block 31 is provided with horizontal slots 31a and 31b to receive L-shaped slide members 38 and with vertical slot 31C to receive pawl member 39. The pawl member 39 is exaggerated in size in FIG. 5 to show the details more clearly. Such members are retained within the slots by plate 40 secured to the block 31. The pawl member 39 is further retained by a pin which passes through hole 40a in the plate and hole 39a in the pawl member so that the pawl member is free to rotate through a small arc. The pawl member 39 also passes through rectangular slots 38a in the slide members 38. The end leg of each slide member 38 is provided with a screw 38b which can be adjusted to serve as a stop to limit the movement of the slide member. The pawl member 39 is so positioned that the cam 28 rides against the pawl 39b of the pawl member. Springs 41 and 42 are attached at one end to the pawl member 39 and at the other end to the end legs of the slide members 38. Another apring 43 is attached at one end to the end of the pawl member 39 and at the other end to the frame so that the lower slide member 39 is normally projecting beyond the face of the block 31 at the time when the depressed portion of the cam 28 is resting against the pawl 39b. Upon further rotation of the cam the raised portion rides against the pawl 39b causing the pawl member 39 to rotate. This causes the lower slide member 38 to retract and the upper slide member 38 to project beyond the face of the block 31. It will be understood that other means may be employed to attain the reciprocating movement of the spring-loaded slide members 38. For example, pivoting pawls or flexing spring members may be used to successively retract and project against the stick slide as hereinafter described. Such pawls and spring members would likewise be engaged by the rotating cam 28.

The internal cross frame of the device is provided with slot 44 adapted to receive a stick slide 45 to which the film 46 is affixed. The stick slide 45 may be made of plastic, metal or like material. The film may be attached to the slide in any conventional manner, for example, adhesive, transparent tape, lamination, projections matching the slots in the film, between welded plastic members, or combinations thereof. Furthermore, it is possible to sensitize the stick and print on the stick optically. Such slide 45 has a series of ratchet teeth 45a and 45b on each side. The respective ratchet teeth 45a and 45b point in opposite directions so that the slide may be reversed. The lower edge of the ratchet teeth, which are in operative position, are disposed at approximately right angles to the vertical axis. The slide is inserted in the slot so that the teeth 45a, which point downward, are positioned on the side of the device where the slide members 38 are located. Such teeth 45a are aligned with the slide members 38 so that either the upper slide member or the lower slide member is pressing against the slide beneath a tooth and holding the stick slide. With the depressed portion of cam 28 resting against the pawl 39b the lower slide member projects beneath a tooth of the stick slide. When the shaft 21 rotates, the raised portion of the cam rides against the pawl 39b causing the pawl member 39 to rotate. Such rotation of the pawl member causes the lower slide member 38 to retract and release the tooth above it. The stick slide drops by gravity but is stopped from moving more than one notch by the upper slide member which has been projected forward beneath another tooth of the stick slide by the further rotation of the pawl member. The continued rotation of the shaft 21 will, in this manner, move the stick slide downward line-by-line. The stick slide can be pulled up manually to repeat any segments of the material on the film. It is possible to advance the film manually by rotating the knob 25. If the teacher wants to stop the projector, as in the case of vocabulary or readiness activity, she would simply hold the knob 25 attached to the shaft 21, thereby causing the belts to slip. In this way she would hold the material in a stationary manner until she was ready to release the knob, which would allow automatic projection to continue. As heretofore pointed out, the movement of the film can also be stopped by moving the handle portion 34 of the plate 32 and applying the brake against the shaft 21. This might be desirable if the teacher wishes to discuss the content of any line on the film.

An alternate method is to drive the stick slide by use of the film perforations in which case the ends of the slide members 38, flexing spring members or like means will be shaped to engaged the film perforations and move the slide and film in a line-by-line manner. In such case the ratchet teeth 45a and 45b can be eliminated.

The cooperation between the lever 32 and the speed shifter provides a tachistoscopic control as mentioned earlier. The purpose of such control is to present single words, members, phrases or symbol material in a tachistoscopic manner at speeds that will not permit the reader to move his eyers. Such training develops perceptual accuracy in the student. As the student attempts to apprehend and retain these brief exposures, he learns to see with greater rapidity, accuracy and orderliness. The tachistoscopic effect is accomplished by applying the brake (spring plate 32) as described above, which stops rotation of the shaft 21 and forward movement of the stick slide. To make a tachistoscopic exposure, the teacher taps the pin 25a on the knob 25 which overcomes the spring plate 32 and allows the shaft to make one revolution at which time it is caught again. During this interval of one rotation the stick drops to a lower position presenting visual material and then drops a second time removing the visual material. The duration of the time of exposure or the time the visual material is presented is dependent on the setting of the speed control 47.

Pushing on or pulling speed selection knob 20a as stated previously changes the projection rate. The 1:1 speed range is used for regular reading while the 1:4 speed range is used for processing training, often referred to as continuous tachistoscopic projection because of the relatively short duration during which each line of material on the film remains in the projection aperture. The purpose of this mode of training is to present single words, placed centrally on each projection line, at rates so rapid as to prevent the reader from refixating or making a second eye movement during the exposure of each word and thus to effect reading rates 25 to 100 faster than the rate of presentation normally used in left to right reading training. A goal of processing training is to remove the physical limitation imposed by the visual functional mechanism of a reader's eyes and allow him to concentrate all his energies on the perceptual act of seeing and assimilating words as continuous sequences of words or thought progressions.

The film 46 mounted on the stick slide 45 bears reading material which is greatly reduced in size thus permitting a considerable amount of print in a small amount of film, for example, 320 lines of print in some 8 inches of film. A greater reduction of copy is considered possible without affecting the reading. The slide format here described has the advantage of being simpler in operation than any cassette load by eliminating the take-up or rewind complications and of providing a considerable amount of protection for the film. The small amount of film employed and the ease of mounting the film on the slide provides considerable savings in softwear production over conventional filmstrip packaging and over cartridge packaging.

The film strip contains two rows of reading material in side-by-side relationship (FIG. 6). As the film strip is fed into the device, only the row on one side is aligned with the projection system. When this row has been completed, the stick slide bearing the film strip is inverted, with the same side facing the projection system, bringing the other row of reading material on the film into alignment with the projection system. By such inversion of the stick slide, the teeth 45b, which were pointing upward, are now pointing downward so that they will engage the slide members 38 as heretofore described.

The diametrically extending helical slot 27 in the cylindrical helix member 26 is interposed to rotate in the path of light between the projection system and the lens. Such slot, shown in perspective and development in FIGS. 6, 7 and 8 is milled so that the slot extends approximately 190° around member or tube 26 which member is of tubular form and actually consists of a pair of similar slots formed in diametrically opposite relationship in the cylindrical member. In the process of milling, the helical slot 27 may be milled diametrically through the tube cutting the slot 27 in the opposite sides of the tube at the same time. It will be seen, therefore, that since the slot extends diametrically through member 26, that as member 26 rotates there will be an open passage for projection light through said member at all times, but due to the helical form of the slot the opening will appear to move across the field of projection.

The rotation of tube 26 allows the projection of portions of the line to be read in sequence progressively across the screen and may expose or allow projection of any desired portion of the line, but approximately one-third of the line is exposed at a time. The effect is that of a slowly moving slot of light uncovering the line of print and when the slot has reached the extreme end of the line, a new line of material is moved into place. The slot disappears at the end of each line and reappears on the left for the new exposure. The rate at which this slot moves and correspondingly the lines exposed per minute can be regulated as desired within reason, such as from 10 lines per minute to approximately 600 lines per minute.

The present system improves a person's ability to view reading material in line-by-line sequence which completely displays a line of at least five words in segments across the line. The greater portion of the line being scanned is occluded and a first segment of the line consisting of one full word or a portion thereof is unveiled. the last segment of the line being scanned consists of at least a portion of the last word of the line so that transition from the end of the line to the beginning of the next line will present to the reader no less print than the equivalent of his average span of recognition. As stated, the segmentation of an individual line can be broken down into any combination of elements. For example, representative of a satisfactory arrangement of segmentation would be a first segment comprising approximately 31 percent of the line, a central segment comprising approximately 54 percent of the line and a final segment comprising approximately 15 percent of the line.

The shift to each new line of print is positioned correctly by the notches on the stick slide, as described above. Because the stick slide uses a gravity feed principle, the indexing from line to line is more rapid than conventional gear or sprocket arrangements. This has the advantage of allowing the print to remain stationary for a greater amount of time, up to the time each line of print is completely occluded. As the print at the end of each line of print vanishes from view, the reading material would be indexed so quickly as to appear motionless by the time any new print is exposed at the beginning of each new line of print.

Interposed between the stick slide 45 holding the film and the helix shaft 21 is a plate sliding mask 35 which is inserted in a slot in the top of the casing. This mask is provided with a handle portion 36 so that it can be raised or lowered by hand. The mask has a series of apertures 37a, 37b, 37c and 37d to permit viewing across the full line of print or only portions of such line. It will be understood that the size, position and number of apertures can be varied to expose any desired portion of a line.

In my U.S. Pat. No. 2,745,313 covering a "Controlled Reading Projector" there is shown a helix with a slot having parallel straight sides and circular ends so that it is uniform throughout, as shown by the dotted line A in FIG. 8. The slot of the present invention has been recut in the form shown by the line B in FIGS. 7 and 8. To obtain the form shown by the Line B, the tube is milled along three lines C1, C2, and C3 to the width shown by the lines D1, D2 and D3 representing the trailing edges along one side and lines E1, E2 and E3 representing the leading edges along the opposite side. The slot is then milled again to remove shaded portions F and G which gives the ultimate slot addition width at the two ends of the slot and modifies the angles of the edges. The final slot defined by the line B has a central portion angularly positioned around the tube 26 with the first and second end portions tilted upwardly and downwardly toward the axis of the tube to give the slot an elbow-like or flattened S configuration. The slot is widened along one edge at the joint between the central portion and the first end portion and also along the opposite edge at the joint between the central portion and the second end portion. Thus, the cylindrical member 26 forms a shutter or mask having an elongated aperture of helical form which serves to unveil each line to view in segments from the beginning of the line to the end of the line. The helical aperture is an elongated slot at least as long as the lines to be scanned and in use is arranged at an angle with respect to the length axis of the line with the initial portion of the line being disposed in a downward direction and the terminal portion in an upward direction with respect to the axis of the line and with the leading and trailing edges of the central segment of the slot and the trailing edge of the initial segment of the slot being disposed at a relatively greater angle to the length axis of the line being scanned than the remaining edges of the slot so that the central and initial segments are scanned and occluded at controlled rates of speed which may be related to the person's reading ability. The leading edge of the initial segment of the slot and the trailing edge of the terminal segment of the slot are disposed at relatively lesser angles whereby the terminal segment of the line is occluded and the initial segment is unveiled at relatively more rapid rates.

The helix with this recut slot will expose print more rapidly at the beginning of each line as well as terminate the scanning at the end of each line more rapidly. As a result, a reader will be prompted to execute a return sweep at an earlier point at the end of each line of print and upon effecting his return sweep to the beginning of each new line of print the reader will always find an amount of print exposed that is appropriate for his span of recognition. To accomplish this, the angle of the lead edge of the initial portion of the helix has been modified so that illimination or unveiling of the print occurs at a faster rate at the beginning of each line of print, the following edge maintains a fairly consistent rate of scanning and occlusion until approximately the last one-seventh of the line, whereupon the occlusion of the line of print is accelerated. Initial testing of the old illusion with the new indicates that this new helix presents lines of print in a manner that conforms more closely to a reader's usual ocular-motor behavior and recognition requirements, thus providing a reader with a more satisfying perceptual experience.

In the redesign of the helix, a prime consideration was that the readers should be provided with no less print than the equivalent of their average span of recognition when returning to the beginning of a new line of print and at any time during their excursion across the line of print and be prompted to execute a return sweep more rapidly at the conclusion of each line of print. This is in contrast to the helix of U.S. Pat. No. 2,745,313 where a reader, with the projection rate set just slightly faster than his usual reading rate, could return to the beginning of a new line of print to find either no print awaiting him or less print that he typically requires in terms of his average span of recognition.

The redesigned helix of the present invention provides one means for accelerating the unveiling of print at the beginning of each line of print and a more rapid occlusion of print at the end of each line as heretofore described. However, it will be understood that this can be accomplished in other ways, such as (1) varying the rate of rotation of the mask, picture, or occluding means by a change of voltage or a change in the nature of the energizing force during scanning; (2) driving the mask or occluding means with a variable pitch cam; (3) using an external helix to mask or occlude the scanning; and (4) using light deflecting means designed to change the rate of the reflection refraction or the transmission of light.

Readers will vary in their ocular-motor behavior for a number of reasons, but some of the factors would center primarily on the individual reactions of various readers to the left-to-right scanning illusion and the manner in which they return to each new line of print. Such individual reactions would be based on:

A. The cue(s) the reader responds to that cause him to initiate a return sweep. Readers will vary in the type of cue(s) they respond to. Following are a few:
  1. The obliteration of the reader's fixation point by the following edge of the helix (the earliest cut)
  2. The reduction of visible print to a point that is less than the average span of recognition of the reader
  3. The upward movement of print
  4. The total elimination of the print cues (the latest cue).

B. Lag Time, or the interval of time the reader delays before executing his return sweep. Readers will remain fixated for varying lengths of time following a cue to execute a return sweep based on:
  1. Their tendency to maintain their usual duration of fixation
  2. The amount of processing time they require
  3. An inertia factor that results from a change of ocular-motor direction.

C. Return sweep interval, or the amount of time it physically takes for a reader to swing back from his last fixation to an initial fixation on a new line of print. This interval of time will typically range between 0.03 seconds and 0.045 seconds, the longer interval of time being required to execute a longer return sweep and in instances where a reader's motility is less well developed.

D. Vergence and Accommodation time would be that interval of time required to fuse in a binocular manner during the first fixation and to accommodate so that print can be seen clearly. Generally, this interval of time ranges between 0.01 seconds and 0.02 seconds for readers with no special visual anomalies.

E. Individual response to the left-to-right scanning illusion. Readers will respond in a rather individual manner to the scanning illusion of the controlled reading device based on the following differences:

1. Some readers will be able to sense and adjust to the average amount of viewing time permitted by the moving slot. A reader who is this responsive will typically execute his usual number of fixations while reducing his duration time. The more accomplished a reader is in this respect, the more similar in length will be his durations of fixation.
2. The tendency of some readers will be to persist in trying to maintain their habitual duration of fixation. These readers will vary more in the durations they effect along a line of print. More ofter than not, they will execute longer durations toward the beginning of a line of print than at the end.
3. Some readers will tend to prolong their duration of fixation as they (a) decrease the number of fixations they make along a line of print, (b) as they consequently execute greater than usual excursions, and (c) because of the increased processing time they require as they attempt to assimilate more print with each fixation.

If the reader responded to the earliest possible clue, which the fixation point obliterated, and his lag time was a minimum 0.125 secs. and his return sweep was quite brief, 0.03 secs. and his vergence and accommodation time was quite short, 0.01 secs., the amount of print provided by the new helix of the present invention would be an amount in accord with or in excess of the reader's average span of recognition requirements. On the other hand, the old helix design provided approximately 15 to 20 percent less than the reader's average span of recognition requirements.

In addition the new helix, by occluding end line of print more rapidly, prompts a reader to execute a return sweep at an earlier point in the line than did the old helix design and by so doing discourages all readers to lag or delay less at the conclusion of each line and to be more responsive to the conclusion of a line of print.

Connected to the gear motor 20 is a potentiometer or speed controller 47 provided with a numbered dial on the outside of the casing so that the motor can be set at the desired speed. The device is thus capable to providing between 10 and 600 lines per minute. The speed shifter, heretofore described, allows for two speed ranges; a reading rate range extending slightly beyond 750–800 words per minute as well as a range extending well beyond 800 words per minute than can present prints at rates up to four times that usual for a reading range in order to provide for skimming or processing training. In addition there is a trim potentiometer 48 or voltage regulator to compensate for the supply voltage variation. This assures that the reading rates on the potentiometer will be accurate.

The controlled reading device of the present invention makes use of projection as a means of presenting the reading material on a front or rear projection screen, and the material to be projected is in film strip 46 form with every two lines of material corresponding to a notch on the stick slide with an average strip comprising title, code and 320 lines of reading and viewing material to be projected, so that each line of material to be projected may be aligned with the projection aperture successively. Since two lines of viewing material correspond to a notch on the stick slide, when one slide member or like means is engaging a notch, the other slide member is positioned between two notches. Thus, as the one slide member retracts and the other projects to engage a notch the stick slide exposes the next line but only moves one half the distance between notches.

In the operation of the device, the instructor determines the speed of operation of the device, that is, the number of lines per minute to be exposed or projected by adjustment of the speed controller 47 and the slide stick, on which is mounted the film strip to be projected, is inserted into the projector. The slide member 38 stops the stick slide when it engages the first notch of the slide. The projector and the motor are turned on and the device is in automatic operation by means of the motor 20 which operates shaft 21, helix members 26 and slot 27, as described above.

The use and purpose of the controlled reading device should be apparent from the foregoing description. Thus, the aforenoted objects and advantages are most effectively attained. Although the preferred embodiment of the invention has been disclosed and described herein, it should be understood that this invention is in no sense limited thereby and its scope is to be determined by that of the appended claims.

Thus as previously indicated, the specific mechanism for obtaining the more rapid unveiling of the initial segment of the line and for obtaining more rapid transition from one line to another may be varied. In addition, under certain circumstances the more rapid occlusion of the end of each line may be omitted provided that the system provides for a more rapid unveiling of the initial portion of the succeeding line.

I claim:

1. A reversible slide stick for use with a film projector of the type having a gravity feed for the slide stick and having a pawl mechanism in the projector for releasing the film strip for gravity feed so as to project successive lines of visual material on the film strip, said slide stick comprising:

an elongated member having successive lines of visual material displayed thereon for projection through said projector and a pair of spaced rows or ratchet teeth extending lengthwise of said member with each row being adjacent a longitudinal edge of the member and being in synchronized relationship with respect to lines of visual material and for releasable engagement by the pawl mechanism of the projector; and the teeth extending out of the plane of the member containing the visual material displayed thereon and one row pointing downward to form a shoulder in one direction for engagement with the pawl mechanism and to permit free movement in the other direction and the other row of teeth pointing downward in the opposite direction to the first row of teeth to thereby permit reversibility of the member in use with the projector.

2. A reversible slide stick for use with a film projector of the type having a gravity feed for the slide stick and having a pawl mechanism in the projector for releasing the film strip for gravity feed so as to project successive lines of visual material on the film strip, said slide stick comprising:

an elongated member having first and second successive lines of visual material displayed thereon in parallel columns for projection through said projector with said columns being in relatively inverted relationship with respect to each other and first and second rows of ratchet teeth extending lengthwise of said member in association with said first and second columns of visual material and also in inverted relationship with respect to each other and in synchronized relationship with respect to the lines of visual material in said columns and adapted for releasable engagement by the pawl mechanism of the projector; and the rows of ratchet teeth being spaced with each row being adjacent a longitudinal edge of the member and the teeth extending out of the plant of the member containing the visual material displayed thereon and one row pointing downward to form a shoulder in one direction for engagement with the pawl mechanism and to permit free movement in the other direction and the other row of teeth pointing downward in the opposite direction to the first row of teeth to thereby permit reversibility of the member in use with the projector.

3. An improved projector for use with a reversible slide stick of the type having visual material displayed thereon in successive lines and having a pair of spaced rows of ratchet teeth extending longitudinally of the slide stick with each row being adjacent a longitudinal edge of the slide stick, said projector comprising:

a lens mechanism, a source of light, a vertical opening for receiving a slide stick in alignment with the lens mechanism and a pawl feed mechanism having operating means for engaging the successive ratchet teeth on a slide stick to alternately retain the slide stick and to release it for substantially vertically downward gravity feed; and the teeth extending out of the plane of the member containing the visual material displayed thereon and one row pointing downward to form a shoulder in one direction for engagement with the pawl mechanism and to permit free movement in the other direction and the other row of teeth pointing downward in the opposite direction to the first row of teeth to thereby permit reversibility of the member in use with the projector.

4. In a projector of the type having a lens system and a source of light, the improvement which comprises:

an elongated reversible slide stick having visual material displayed thereon in successive lines and a pair of spaced rows of ratchet teeth extending longitudinally thereof with each row being adjacent a longitudinal edge of the slide stick receiving aperture in said projector with the slide stick disposed therein in alignment with the lens system, a pawl mechanism for engaging successive ratchet teeth on the slide stick and means for operating the pawl mechanism so as to alternately engage successive ratchet teeth to retain the slide stick in position with successive lines of visual material in alignment with the lens system and for releasing the ratchet teeth so that the slide stick feeds vertically downwardly under gravity; and the teeth extending out of the plane of the slide stick containing the visual material displayed thereon and one row pointing downward to form a shoulder in one direction for engagement with the pawl mechanism and to permit free movement in the other direction and the other row of teeth pointing downward in the opposite direction to the first row of teeth to thereby permit reversibility of the member in use with the projector.

* * * * *

UNITED STATES PATENT OFFICE
CERTIFICATE OF CORRECTION

PATENT NO. : 3,905,695
DATED : September 16, 1975
INVENTOR(S) : Stanford E. Taylor It is certified that error appears in the above-identified patent and that said Letters Patent are hereby corrected as shown below:

Column 5, line 3, after "25" insert --%--.

Column 5, line 3, after "100" insert --%--.

Column 10, line 20, after "rows" change "or" to --of--.

Column 10, line 57, change "plant" to --plane--.

Signed and Sealed this

Sixth Day of July 1976

[SEAL]

Attest:

RUTH C. MASON
Attesting Officer

C. MARSHALL DANN
Commissioner of Patents and Trademarks